United States Patent
Bredenbeck et al.

(10) Patent No.: US 10,647,422 B2
(45) Date of Patent: May 12, 2020

(54) PITCH CONTROL SYSTEM

(71) Applicant: Sikorsky Aircraft Corporation, Stratford, CT (US)

(72) Inventors: Kevin L. Bredenbeck, Stuart, FL (US); Bryan S. Cotton, Poplar Grove, IL (US); Mark K. Wilson, West Palm Beach, FL (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 16/410,843

(22) Filed: May 13, 2019

(65) Prior Publication Data

US 2020/0023956 A1 Jan. 23, 2020

Related U.S. Application Data

(62) Division of application No. 15/502,684, filed as application No. PCT/US2015/047156 on Aug. 27, 2015.

(Continued)

(51) Int. Cl.
*B64C 27/57* (2006.01)
*B64C 11/30* (2006.01)
(Continued)

(52) U.S. Cl.
CPC .............. *B64C 27/57* (2013.01); *B64C 11/30* (2013.01); *B64C 11/305* (2013.01); *B64C 11/34* (2013.01);
(Continued)

(58) Field of Classification Search
CPC ........ B64C 27/57; B64C 11/30; B64C 11/34; B64C 27/56; B64C 11/305; B64C 11/40; B64C 27/82; B64C 2027/8236
See application file for complete search history.

(56) References Cited

U.S. PATENT DOCUMENTS 2,242,314 A   5/1941   Martin et al.
2,455,378 A   12/1948  McCoy
(Continued)

FOREIGN PATENT DOCUMENTS

DE   3543326 A1   6/1987
GB   517117 A     1/1940
GB   2073114 A    10/1981

OTHER PUBLICATIONS

Extended European Search Report; European Application No. 15842277.4; dated Mar. 28, 2018; 9 Pages.
(Continued)

*Primary Examiner* — Assres H Woldemaryam
(74) *Attorney, Agent, or Firm* — Cantor Colburn LLP

(57) ABSTRACT

A pitch control system configured to vary a pitch angle of at least one of a plurality of propeller blades of a propeller system is provided including a switch movable between a neutral position and a plurality of non-neutral positions. Movement of the switch to a first non-neutral position generates a command to move the propeller blades in a first direction. Movement of the switch to a second non-neutral position generates a command to move the propeller blades in a second direction. Movement of the switch to a third non-neutral position generates a command to move the propeller blades to a zero thrust position.

5 Claims, 8 Drawing Sheets

Related U.S. Application Data

(60) Provisional application No. 62/043,159, filed on Aug. 28, 2014.

(51) Int. Cl.
    *B64C 27/82*            (2006.01)
    *B64C 11/34*            (2006.01)
    *B64C 27/56*            (2006.01)
    *B64C 11/40*            (2006.01)

(52) U.S. Cl.
    CPC ............. *B64C 11/40* (2013.01); *B64C 27/56* (2013.01); *B64C 27/82* (2013.01); *B64C 2027/8236* (2013.01)

(56) References Cited

U.S. PATENT DOCUMENTS

| | | | |
|---|---|---|---|
| 2,740,255 A | 4/1956 | Machlanski | |
| 2,740,483 A | 4/1956 | Machlanski | |
| 2,868,304 A | 1/1959 | Horn | |
| 3,332,643 A | 7/1967 | Toner | |
| 3,490,296 A | 1/1970 | Yates et al. | |
| 3,599,652 A * | 8/1971 | Perkins | F02C 9/263 137/2 |
| 3,699,771 A | 10/1972 | Chelminski | |
| 3,866,857 A * | 2/1975 | Ciastula | B64C 27/32 244/17.25 |
| 4,028,004 A | 6/1977 | Wind | |
| 4,195,802 A | 4/1980 | Gilson et al. | |
| 4,534,524 A | 8/1985 | Aldrich | |
| 4,662,174 A | 5/1987 | Toulmay | |
| 4,667,909 A | 5/1987 | Curci | |
| 4,789,305 A | 12/1988 | Vaughen | |
| 5,076,517 A | 12/1991 | Ferranti et al. | |
| 5,127,608 A | 7/1992 | Farineau et al. | |
| 5,149,023 A | 9/1992 | Sakurai et al. | |
| 5,213,282 A | 5/1993 | Gold et al. | |
| 5,291,113 A | 3/1994 | Hegg et al. | |
| 5,428,543 A | 6/1995 | Gold et al. | |
| 5,468,257 A | 11/1995 | Probst et al. | |
| 5,472,156 A | 12/1995 | Bivens, III et al. | |
| 5,738,494 A * | 4/1998 | Schmaling | B64C 27/33 416/134 A |
| 5,900,710 A | 5/1999 | Gautier et al. | |
| 5,997,250 A * | 12/1999 | Carter, Jr. | B64C 11/40 416/1 |
| 6,086,016 A * | 7/2000 | Meek | B64C 27/02 244/17.11 |
| 6,334,592 B1 | 1/2002 | Tomio et al. | |
| 6,512,344 B1 | 1/2003 | Konno et al. | |
| 6,572,055 B1 | 6/2003 | Bernard | |
| 7,438,259 B1 | 10/2008 | Piasecki et al. | |
| 7,648,106 B2 | 1/2010 | Granier et al. | |
| 8,074,940 B2 | 12/2011 | Kopp | |
| 8,196,857 B2 | 6/2012 | Gemmati et al. | |
| 8,465,257 B1 | 6/2013 | Noble et al. | |
| 8,991,744 B1 * | 3/2015 | Khan | B64C 27/52 244/17.11 |
| 9,085,372 B2 * | 7/2015 | Saucray | B64D 31/12 |
| 2003/0192737 A1 | 10/2003 | Han et al. | |
| 2003/0226937 A1 | 12/2003 | Einthoven et al. | |
| 2006/0269413 A1 * | 11/2006 | Cotton | B64C 27/10 416/170 R |
| 2008/0237392 A1 | 10/2008 | Piasecki et al. | |
| 2009/0266940 A1 * | 10/2009 | Miller | B64C 13/10 244/223 |
| 2009/0314901 A1 | 12/2009 | Granier et al. | |
| 2010/0308178 A1 | 12/2010 | Gemmati et al. | |
| 2011/0024551 A1 * | 2/2011 | Biest | B64C 13/46 244/6 |
| 2011/0108673 A1 | 5/2011 | Antraygue | |
| 2012/0097800 A1 | 4/2012 | Burroughs et al. | |
| 2012/0255386 A1 | 10/2012 | Couderc et al. | |
| 2013/0206898 A1 | 8/2013 | Yates et al. | |
| 2013/0206900 A1 | 8/2013 | Yates et al. | |
| 2013/0209256 A1 | 8/2013 | Yates et al. | |
| 2013/0211631 A1 | 8/2013 | Yates et al. | |
| 2014/0077025 A1 | 3/2014 | Yates et al. | |
| 2014/0263850 A1 | 9/2014 | Kerdreux et al. | |
| 2015/0001336 A1 | 1/2015 | Eglin | |
| 2015/0191241 A1 | 7/2015 | Antraygue | |
| 2015/0329199 A1 | 11/2015 | Golborne et al. | |
| 2015/0367937 A1 | 12/2015 | Greenfield et al. | |
| 2016/0083103 A1 * | 3/2016 | Munier | B64D 31/04 239/265.19 |
| 2017/0225776 A1 | 8/2017 | Cyr et al. | |
| 2017/0233066 A1 | 8/2017 | Bredenbeck, Jr. et al. | |

OTHER PUBLICATIONS

Extended European Search Report; European Application No. 15842927.4; dated Mar. 27, 2018; 7 Pages.

International Search Report for International Appln. No. PCT/US2015/047150; International Filing Date: Aug. 27, 2015; dated Apr. 11, 2016; 10 Pages.

International Search Report for International Appln. No. PCT/US2015/047156; International Filing Date: Aug. 27, 2015; dated Apr. 8, 2016; 11 pages.

Written Opinion of the International Searching Authority for International Application No. PCT/US2015/047150 dated Mar. 28, 2016; dated Apr. 11, 2016; 5 pages.

Written Opinion of the International Searching Authority of the International Application No. PCT/US2015/047156 dated Mar. 21, 2016; dated Apr. 8, 2016; 6 pages.

\* cited by examiner

PITCH CONTROL SYSTEM

CROSS-REFERENCE TO RELATED APPLICATIONS

This application is a Divisional of U.S. application Ser. No. 15/502,684, filed Feb. 8, 2017, which is a National Stage application of PCT/US2015/047156, filed Aug. 27, 2015, which claims the benefit of U.S. Provisional Application No. 62/043,159, filed Aug. 28, 2014, the contents of which are incorporated by reference in their entirety herein.

BACKGROUND OF THE INVENTION

Embodiments of the invention generally relate to a propeller system of a rotary wing aircraft, and more particularly, to a system for controlling the pitch of a variable pitch propeller system of a high-speed rotary wing aircraft.

A rotary wing aircraft with a rigid coaxial contra-rotating rotor system is capable of higher speeds compared to conventional singe rotor helicopters due in part to the balance of lift between the advancing sides of the main rotor blades on the upper and lower rotor systems. To still further increase airspeed, supplemental translational thrust is provided by a translational thrust system, such as a propeller system oriented substantially horizontal and parallel to the aircraft longitudinal axis to provide thrust for high speed flight. The thrust generated by the variable pitch propeller translational thrust system is affected by varying the pitch of the propeller blades individually as the rotor rotates and by varying the pitch of at least one of the plurality of propeller blades.

Prior art high speed, coaxial, rotary wing aircrafts utilize translational thrust provided by one or more turbojets. The collective control of such aircrafts commonly include at least one twist grip throttle to control the turbojets. An operator applies a rotational force to the twist grip in a first direction to increase fuel flow to the engine, resulting in increased thrust of the aircraft. If a rotational force is applied to the twist grip in a second, opposite direction, the fuel flow supplied to the engines is decreased, thereby reducing the thrust output of the engine.

Therefore, the introduction of a variable pitch propeller translational thrust systems necessitates the need for a new control and interface to allow the pilot to directly control propeller thrust output.

BRIEF DESCRIPTION OF THE INVENTION

According to one embodiment of the invention, a pitch control system configured to vary a pitch angle of at least one of a plurality of propeller blades of a propeller system is provided including a switch movable between a neutral position and a plurality of non-neutral positions. Movement of the switch to a first non-neutral position generates a command to move the propeller blades in a first direction. Movement of the switch to a second non-neutral position generates a command to move the propeller blades in a second direction. Movement of the switch to a third non-neutral position generates a command to move the propeller blades to a zero thrust position.

In addition to one or more of the features described above, or as an alternative, in further embodiments a length of time that the switch is held in the first position determines an angle to rotate the propeller blades in the first direction.

In addition to one or more of the features described above, or as an alternative, in further embodiments a length of time that the switch is held in the second position determines an angle to rotate to propeller blades in the second direction.

In addition to one or more of the features described above, or as an alternative, in further embodiments wherein the zero thrust position is calculated based on measured airspeed and rotor revolutions per minute.

In addition to one or more of the features described above, or as an alternative, in further embodiments wherein the switch includes a biasing mechanism configured to bias the switch from a non-neutral position to the neutral position.

According to another embodiment of the invention, a method of adjusting a pitch of a plurality of propeller blades is provided including measuring an airspeed and rotor revolutions per minute. Operation in slew mode or track mode is then determined. A command is issued to one or more actuators coupled to the propeller blades. The pitch of one or more of the propeller blades is changed via the one or more actuators.

In addition to one or more of the features described above, or as an alternative, in further embodiments in slew mode, the command for the one or more actuators is generated manually via a pitch control system.

In addition to one or more of the features described above, or as an alternative, in further embodiments the pitch control system includes a switch movable between a neutral position and a plurality of non-neutral position. The command is generated based on the non-neutral position and a length of time that the switch is held in that non-neutral position.

In addition to one or more of the features described above, or as an alternative, in further embodiments in track mode, the command for the one or more actuators is generated automatically by a flight control computer.

According to yet another embodiment of the invention, a rotary wing aircraft is provided including a propeller system having a plurality of propeller blades. A pilot interface includes a pitch control system configured to adjust a pitch angle of the propeller blades of the propeller system. The pitch control system includes a switch movable between a neutral position and a plurality of non-neutral positions. Movement of the switch to a first non-neutral position generates a command to move the propeller blades in a first direction. Movement of the switch to a second non-neutral position generates a command to move the propeller blades in a second direction. Movement of the switch to a third non-neutral position generates a command to move the propeller blades to a zero thrust position.

In addition to one or more of the features described above, or as an alternative, in further embodiments a length of time that the switch is held in the first position determines an angle to rotate the propeller blades in the first direction.

In addition to one or more of the features described above, or as an alternative, in further embodiments a length of time that the switch is held in the second position determines an angle to rotate to propeller blades in the second direction.

In addition to one or more of the features described above, or as an alternative, in further embodiments wherein the zero thrust position is calculated based on measured airspeed and rotor revolutions per minute.

In addition to one or more of the features described above, or as an alternative, in further embodiments wherein the switch includes a biasing mechanism configured to bias the switch from a non-neutral position to the neutral position.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1A:
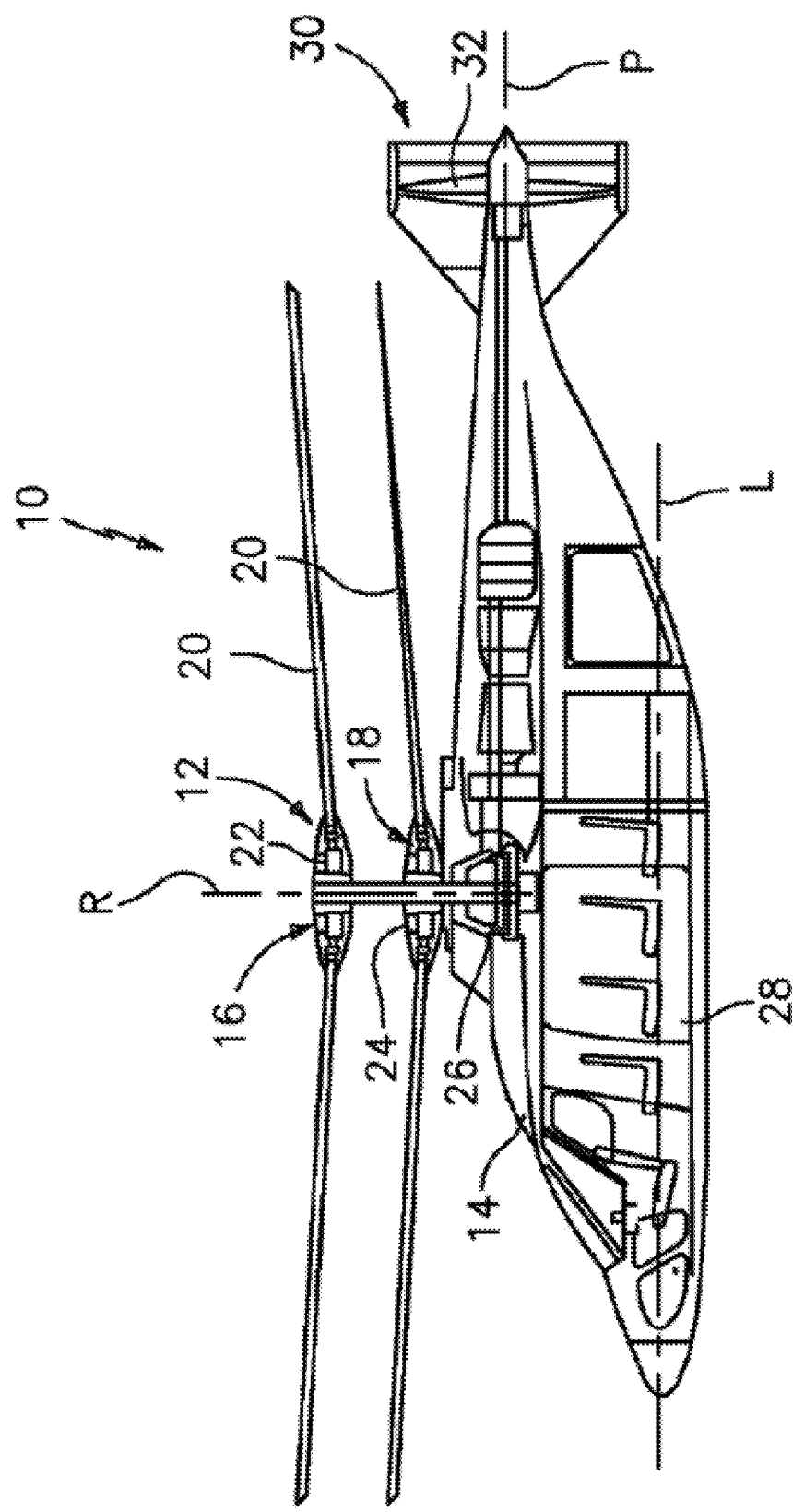
FIGS. 1A and 1B are general side and top views of an exemplary rotary wing aircraft for use with the present invention.
Figure 1B:
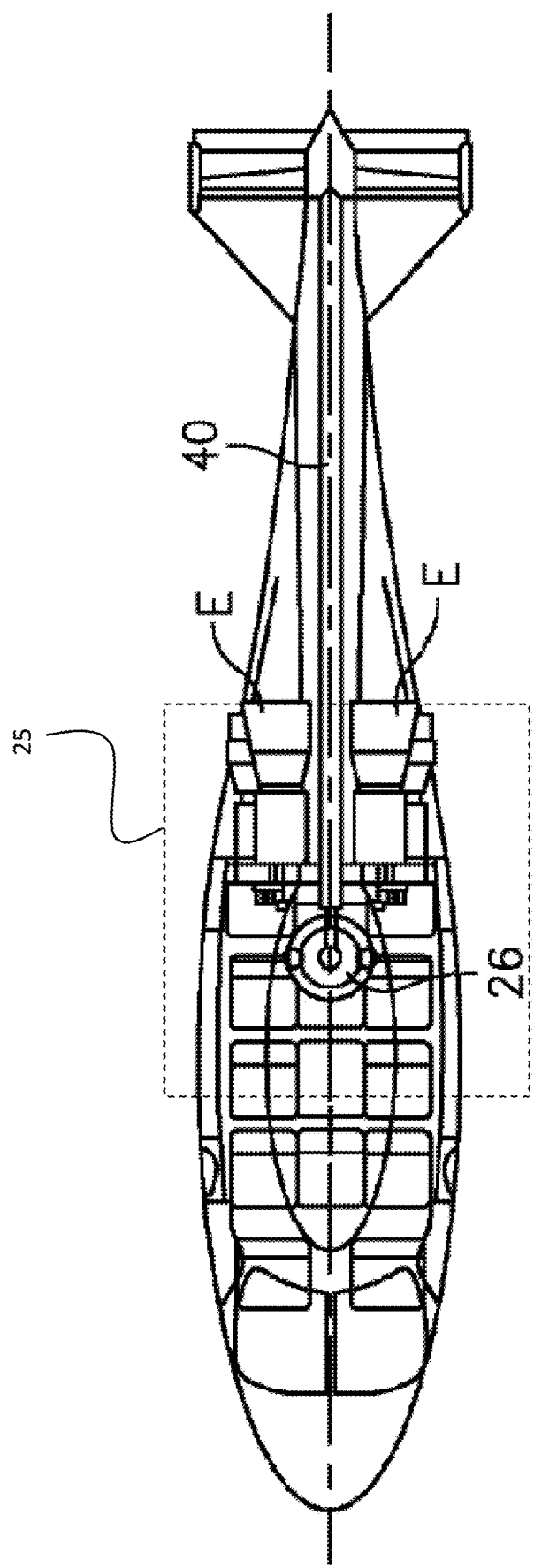

FIGS. 1A and 1B illustrate an exemplary vertical takeoff and landing (VTOL) high speed compound or coaxial contra-rotating rigid rotor aircraft 10 having a dual, contra-rotating main rotor system 12, which rotates about a rotor axis of rotation R. The aircraft includes an airframe 14 which supports the dual, contra-rotating, coaxial main rotor system 12 as well as a translational thrust system 30 which provides translational thrust generally parallel to an aircraft longitudinal axis L.

The main rotor system 12 includes an upper rotor system 16 and a lower rotor system 18. A plurality of rotor blades assemblies are 20 mounted to a rotor hub 22, 24 of each rotor system 16, 18, respectively. The main rotor system 12 is driven by a transmission 25. The translational thrust system 30 may be any propeller system including, but not limited to a pusher propeller, a tractor propeller, a nacelle mounted propeller etc. The illustrated translational thrust system 30 includes a pusher propeller system 32 with a propeller rotational axis P oriented substantially horizontal and parallel to the aircraft longitudinal axis L to provide thrust for high speed flight. The translational thrust system 30 may be driven through the main gearbox 26 which also drives the rotor system 12.

The transmission 25 includes a main gearbox 26 driven by one or more engines, illustrated schematically at E. The main gearbox 26 and engines E are considered as part of the non-rotating frame of the aircraft 10. In the case of a rotary wing aircraft, the gearbox 26 may be interposed between one or more gas turbine engines E, the main rotor system 12 and the translational thrust system 30. In one embodiment, the main gearbox 26 is a split torque gearbox which carries torque from the engines E through a multitude of drivetrain paths. Although a particular rotary wing aircraft configuration is illustrated and described in the disclosed non-limiting embodiment, other configurations and/or machines with rotor systems are within the scope of the present invention.

Figure 2:
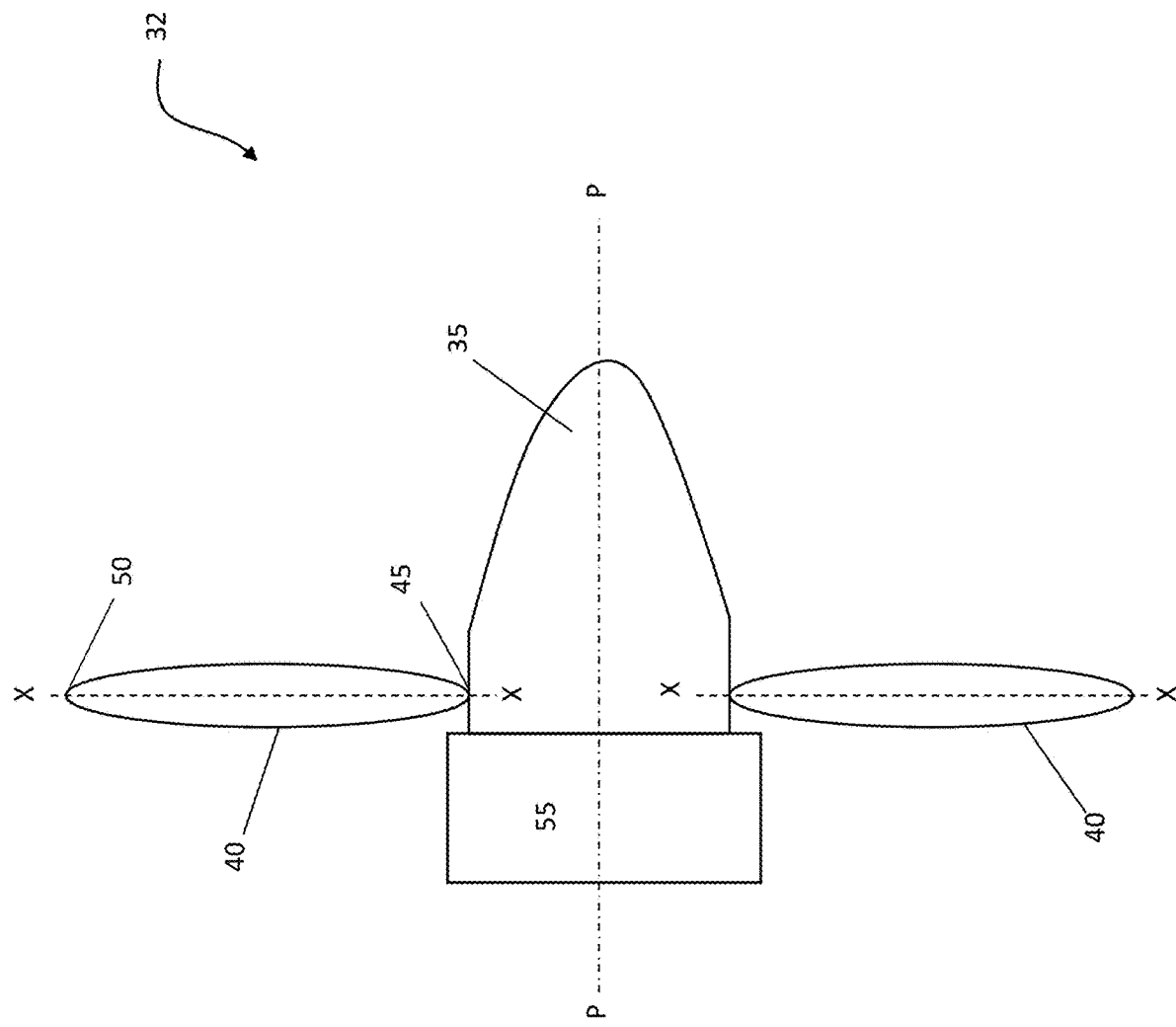
FIG. 2 is a cross-section of a propeller system of a translational thrust system of a rotary wing aircraft.

Referring now to FIG. 2, an example of the propeller system 32 of the translational thrust system 30 is illustrated in more detail. The propeller system 32 includes a hub assembly 35 configured to support a plurality of propeller blades 40 extending outwardly therefrom. The root end 45 of each blade 40 is mounted to the hub assembly 35 such that an axis X of each blade 40, extending from the root end 45 to the tip 50, is arranged within a plane (not shown). The axis of rotation P of the hub assembly 35 is substantially perpendicular to the plane defined by the blades 40. In one embodiment, the propeller 32 is a variable pitch propeller such that the blades 40 are configured to rotate about their respective X axes relative to the hub assembly 35. The translational thrust system 30 includes at least one actuator 55, such as an electro-mechanical actuator for example, configured to adjust the pitch of one or more blades 40 of the propeller system 32.

Figure 3:
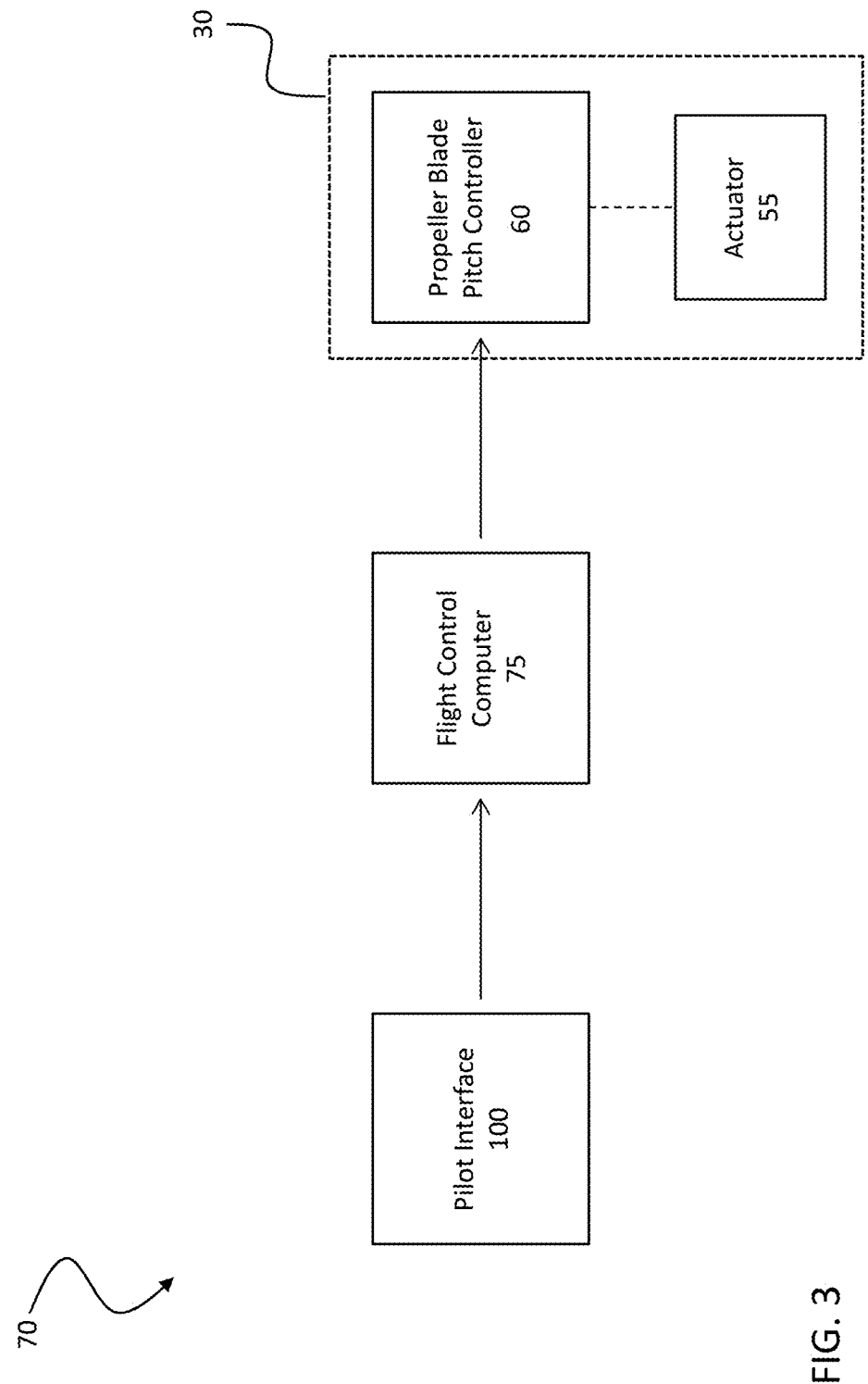
FIG. 3 is a schematic diagram of a flight control system of a rotary wing aircraft according to an embodiment of the invention.

Portions of the VTOL rotary wing aircraft 10, such as the translational thrust system 30 for example, are driven by a flight control system 70, illustrated in FIG. 3. In one embodiment, the flight control system 70 is a fly-by-wire control system (FBW). In a FBW flight control system, there is no direct mechanical coupling between a pilot's controls and a movable component of the rotary wing aircraft 10, for example the propeller blades 40. Instead of using cables, a FBW control system includes a plurality of sensors (not shown) which sense the position of the controls and generate electrical signals proportional to the sensed position. The electrical signals, as well as additional aircraft data is provided to a flight control computer (FCC) 75. In response to the inputs, the flight control computer 75 transmits a signal to a controller of an actuator, such as a propeller blade pitch controller 60 configured to activate actuator 55 to rotate one or more of the propeller blades 40 of the propeller system 32 about a respective axis X. In the illustrated FBW system, an operator may provide a manual input to the flight control computer 75 through an operator interface 100, such as a cyclic or collective control for example.

Figure 5:
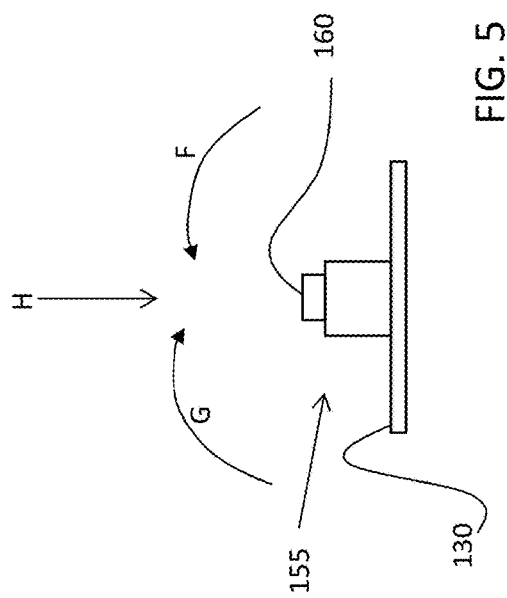
FIG. 5 is a cross-sectional view of a switch of the pitch control system according to an embodiment of the invention.
Figure 4:
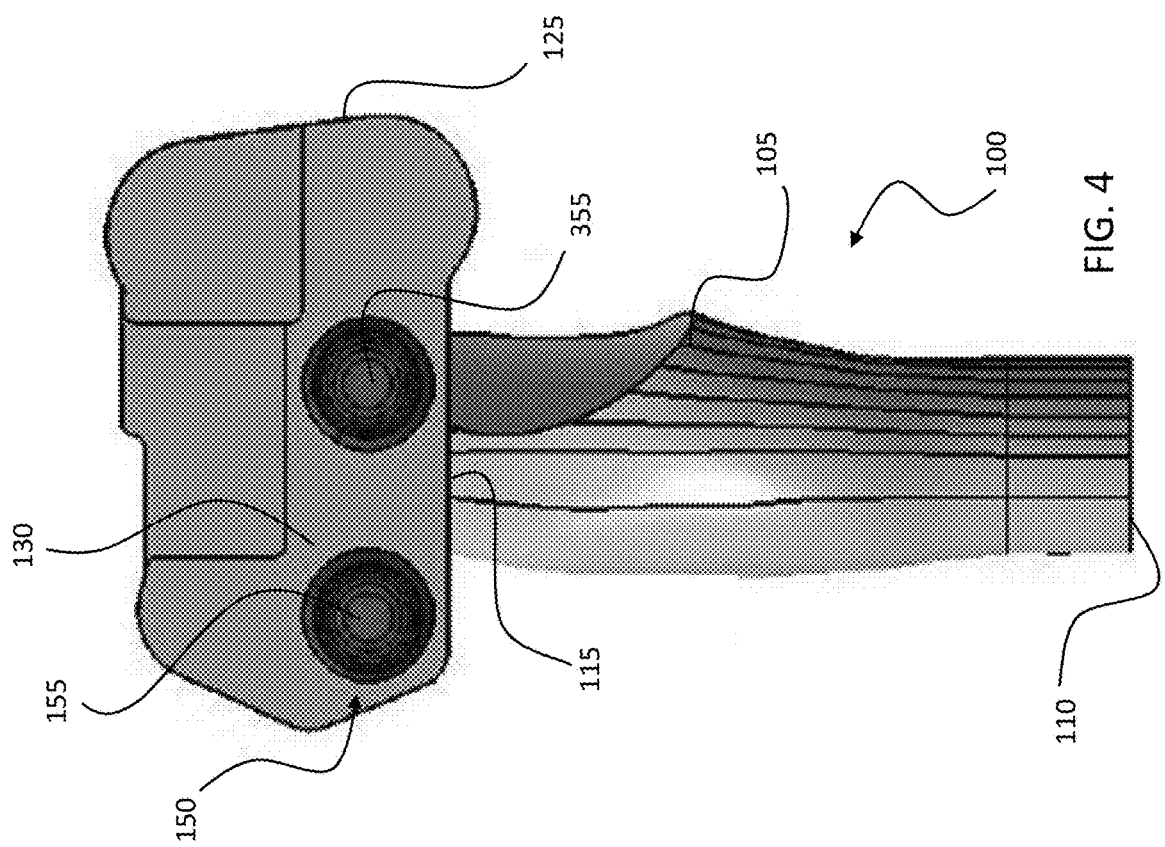
FIG. 4 is a perspective view of a pilot interface including a pitch control system according to an embodiment of the invention.

Referring now to FIGS. 4 and 5, an example of an operator interface 100 configured to control the pitch of the blades 40 of the propeller system 32 includes a grip body 105 having a shape generally complementary to the contour of an operator's hand. A first end 110 of the grip body 105 is configured to attach the grip body 105 to another component, such as within the cockpit of the rotary wing aircraft 10 for example. Arranged at a second, opposite end 115 of the grip body 115 is a grip head 125. A pitch control system 150 including at least one switch 155 is mounted to the surface 130 of the grip head 125 facing the operator. In one embodiment, a roughened material (not shown), such as a knurled or anti-skid tape for example, is positioned over a portion of the switch 155 to prevent slippage of an operator's finger therefrom.

The switch 155, as illustrated in more detail in FIG. 5, is a toggle or rocker switch configured to move between a neutral position and a plurality of operating positions. When the toggle 160 of switch 155 is pivoted from the neutral position to a first position, such as in a direction indicated by arrow F for example, the pitch control system 150 generates a first signal. Similarly, when the toggle 160 is pivoted from the neutral position to a second position, such as in a direction indicated by arrow G for example, the pitch control system 150 generates a second signal. Application of a downward force may cause the toggle 160 to translate along an axis towards the surface 130 of grip 125, in a direction indicated by arrow H, to a third position. The switch 155 additionally includes at least one biasing mechanism (not shown) configured to bias the toggle 160 from each of the first, second, and third positions back to the neutral position.

Pivoting the toggle 160 to either the first or second position is configured to increase or decrease the pitch angle, and therefore the thrust generated by the blades 40 of the propeller 32, respectively. In one embodiment, the first signal generated by the pitch control system 150 when the toggle 160 is moved to the first position indicates to the FCC 75 and/or a controller 60 to move the propeller blades 40 in a first direction about axis X. Similarly, the second signal generated by the pitch control system 150 when the toggle 160 is moved to the second position causes the propeller blades 40 to move in a second, opposite direction about axis X. The toggle 160 may be held against the biasing force of the biasing mechanism (not shown) in either the first or second position until a desired propeller pitch command or maximum pitch angle is reached. A similar movement of the toggle 160 in the forward and backward direction may, but need not result in an equal, but opposite movement of the propeller blades 40 about the blade axis X. Upon receipt of the first signal or the second signal, the FCC 75 may be configured to output the intended position of the propeller blades 40 on a display device visible to the operator applying a force to the switch 155.

Movement of the toggle 160 from the neutral position to the third position causes the blades 40 of the propeller 32 to move to a "zero thrust position." The flight control computer 75 operably coupled to the pitch control system 150 is configured to calculate, such as with an algorithm for example (see FIG. 7), the zero thrust position of the blades 40 based on flight conditions of the rotary wing aircraft 10. Exemplary flight conditions that are used as inputs for determining the zero thrust position of the blades 40 include, but are not limited to airspeed and rotor revolutions per minute.

Figure 7:
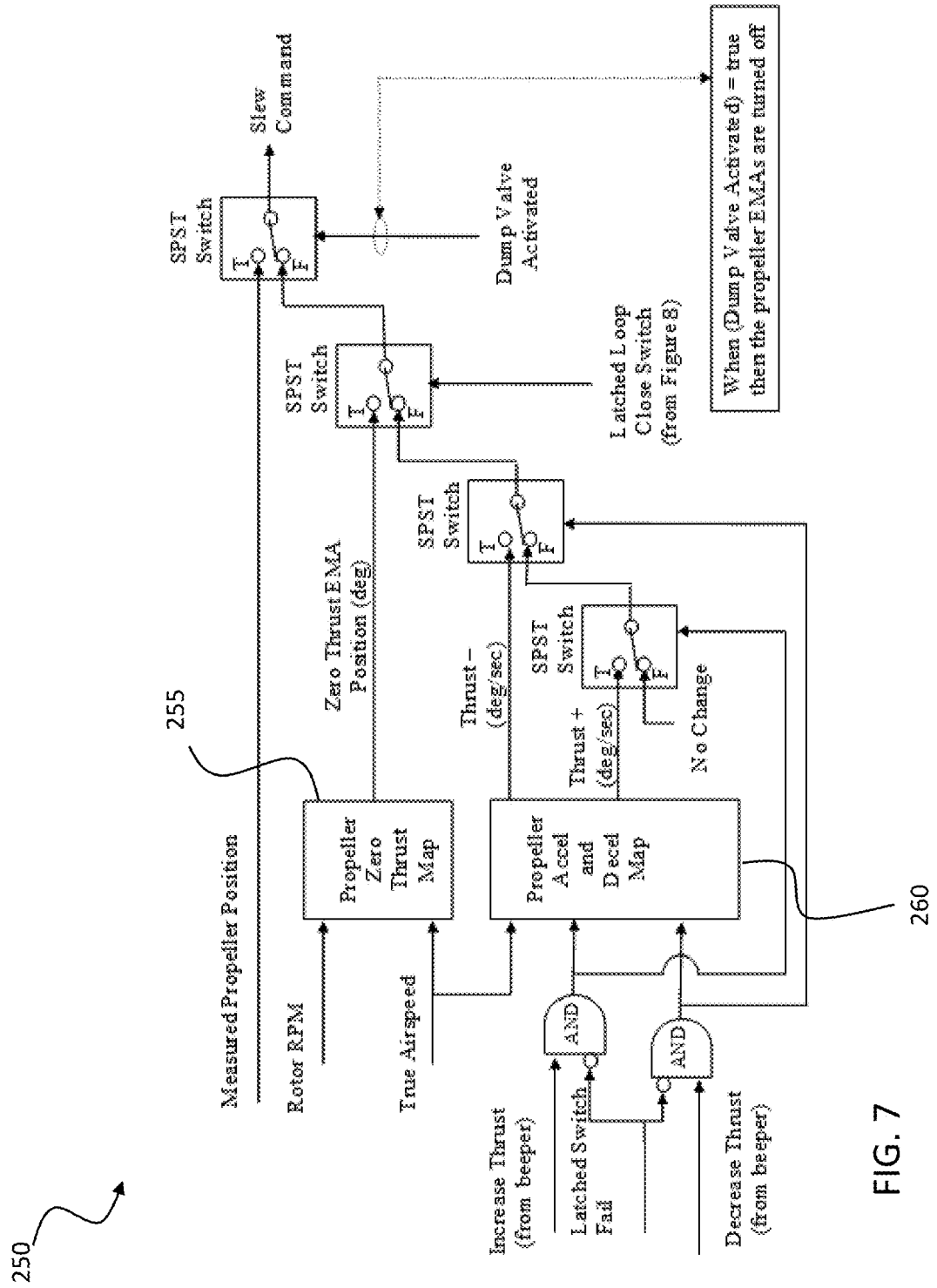
FIG. 7 is a schematic diagram of a control algorithm for the pitch control system of a rotary wing aircraft according to an embodiment of the invention.

During operation of the aircraft 10, a pilot generally adjusts the thrust of the aircraft 10 by moving the toggle 160 of a switch 155 either to a first position or a second position. After holding the toggle 160 in that position for one second, the rate of propeller blade pitch change increases as governed by an acceleration and deceleration map (FIG. 7). The pilot may hold the toggle 160 in that position until a desired propeller pitch command is achieved or until the maximum pitch is reached. Fine changes in the thrust of the aircraft 10 are generally made during the initial second that the toggle 160 is moved from the neutral position, and then the rate of change may, but need not increase. To transition the aircraft 10 to a hover state vs. a flight state, the pilot can adjust the pitch of the propeller blades 40 by moving the toggle 160 between the first and second positions as necessary, or alternatively, by pressing the toggle 160 inward to transition the propeller blades 40 to the zero thrust position.

Figure 6:
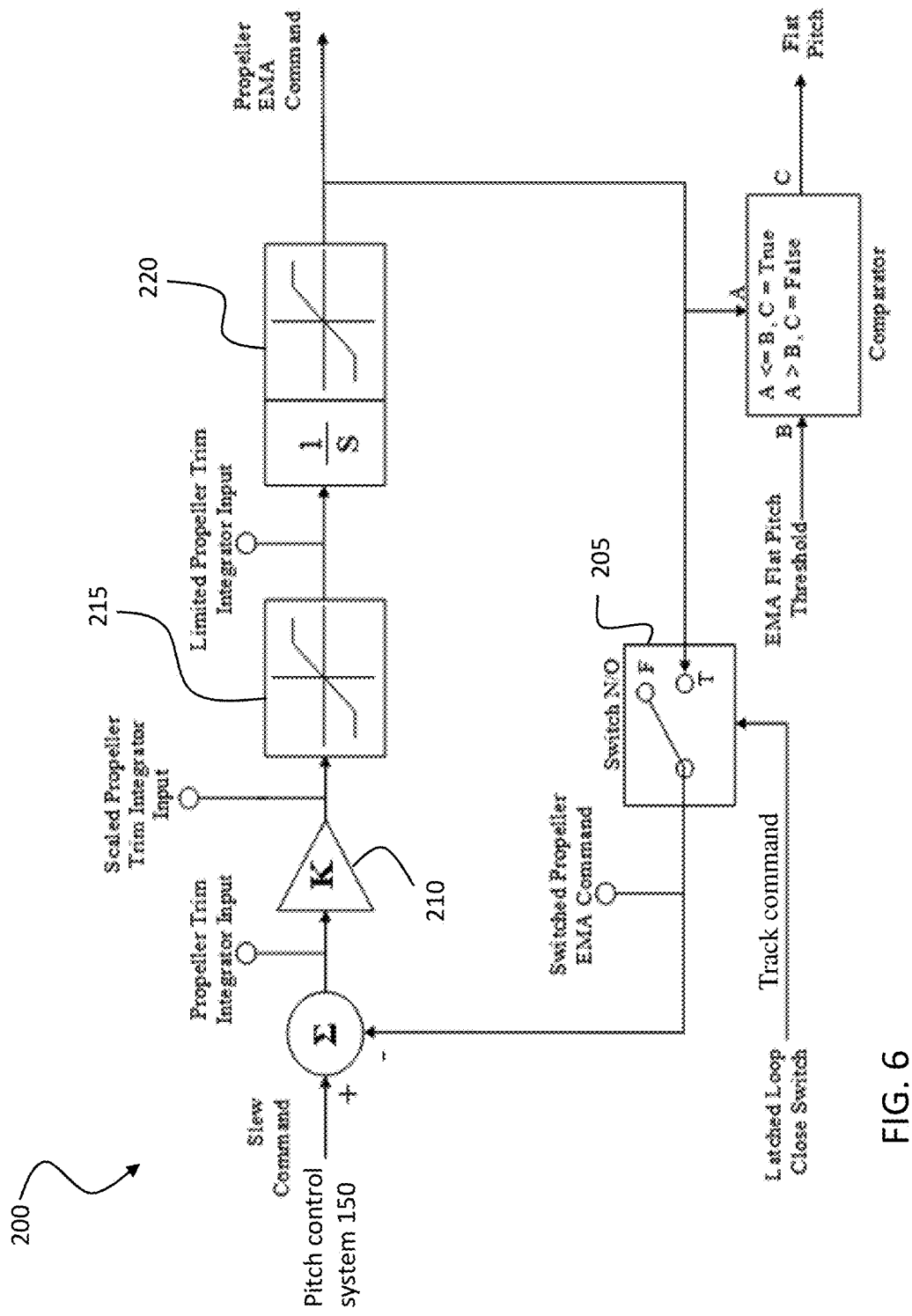
FIG. 6 is a schematic diagram of a control algorithm for the pitch control system of a rotary wing aircraft according to an embodiment of the invention.
Figure 8:
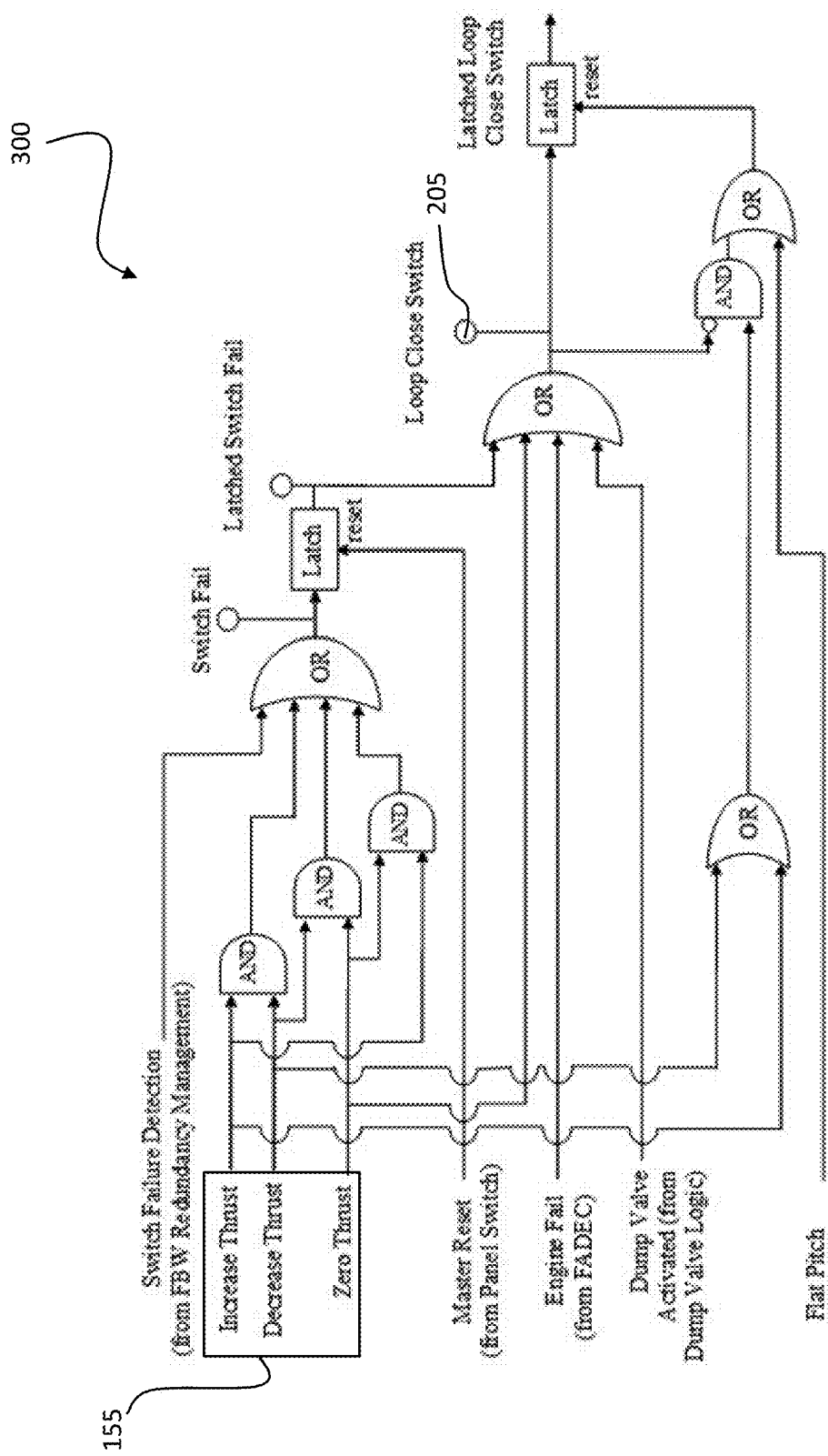
FIG. 8 is a schematic diagram of a control algorithm for the pitch control system of a rotary wing aircraft according to an embodiment of the invention.

Referring now to FIGS. 6-8, a plurality of control laws are implemented within the flight control system 70 to drive a change of the pitch angle of the propeller blades 40. As illustrated in FIG. 6, a control system 200 configured to adjust the pitch of the propeller blades 40 about axis X is operable in either a first mode or a second mode. In the first "slew" mode, the control system 200 is configured to receive an input from the pitch control system 150 as the switch 155 is operated manually by a pilot. In the second "track" mode, the control system 200 is configured to receive a position of the propeller blades 40 calculated based on a zero thrust map 255 when operation of the rotary wing aircraft 10 is controlled by the FCC 75, such as when the aircraft 10 is in autopilot mode for example. In addition, other autopilot inputs, for example airspeed hold, may also be used to control the operation of the propeller.

The control system 200 includes a latched loop close switch 205 configured to control the operational mode of the control system 200. In the illustrated, non-limiting embodiment, the switch 205 is generally arranged in an open position such that the control system 200 defaults to operation in the first mode. As illustrated in the FIG., when the switch 205 is open and the control system 200 is in the first mode, an input from the pitch control system 150, such as a signal generated when the toggle 160 is moved either to the first position or the second position for example, is provided to the control system 200. The signal indicates not only a direction in which the toggle 160 was moved, but also an ultimate position of the propeller blades 40 based on the length of time that the toggle 160 was held in that non-neutral position. A limiter 215 arranged downstream from a modifier 210 is configured to limit the speed at which the pitch angle of the propeller blades 40 changes based on a modified input command. An integrator 220 configured to receive a signal from the limiter 215 changes the command into an angle before supplying the command to a propeller actuator 55. To operate the control system 200 in the second mode, an input causes the latched loop close switch 205 to close, such that the control system 200 forms a closed loop.

Referring now to FIG. 7, the control system 250 illustrated is configured to operate in conjunction with the control system 200 of FIG. 6, to determine whether the control system 200 should operate in either the first mode or the second mode. A plurality of inputs, including three numeric values, and five discrete logical values, are provided to the control system 250. The three numeric values include the current measured propeller position, true airspeed, and main rotor RPM, which are occasionally or continuously monitored and provided to the control system 250 by various sensors. The discrete logical values include the pitch control system command, an increase/decrease thrust command, latched switch fail, latched loop close switch, and dump valve activated. The latched switch fail signal is provided from the control system 300 illustrated in FIG. 8. The latched switch fail input ensures that in the presence of switch failures, the pitch angle of the propeller 32 will not change when the toggle 160 of the switch 155 of the pitch control system 150 is moved from the neutral position. The latched loop close switch input is similarly provided from the control system 300 of FIG. 8 and is configured to control operation of the control system 200 of FIG. 6 between the first and second modes.

The control system 250 of FIG. 7 includes a first map 255 and a second map 260, as well as a network of switches 260 that select the appropriate map value with a predetermined priority. The first map 255 is a zero thrust map and is configured to calculate the position of the propeller blades 40 that would result in zero net thrust generation based on the main rotor RPM and the true airspeed input thereto. Alternative inputs to the zero thrust map 255 used to calculate the zero thrust position of the propeller blades 40 may include indicated or calibrated airspeed in conjunction with instrument or atmospheric corrects, or the ratio between forward airspeed and rotational speed of the propeller. The second map 260 is the propeller acceleration and deceleration map. In the illustrated, non-limiting embodiment, the second map 260 is configured to output a small positive value for acceleration and a small negative value for deceleration. Upon holding the toggle 160 of switch 155 in the first or second position for a certain period of time, the values increase as controlled by the airspeed map 260. For example, when the toggle 160 is held in a non-neutral position for a short length of time, the map 260 allows fine adjustments of the propeller thrust for use in trimming up to an airspeed. When the toggle 160 is held in a non-neutral position for a longer length of time, commands are allowed which produce acceptable acceleration and torque transients.

The dump valve is a means for the pilot to drive the propeller blades 40 to a flat pitch position if there is a failure in any of the FBW system, the electro-mechanical actuators, or the linkage used to position the propeller 32. When the dump valve is activated, the propeller 32 will move to a flat pitch due to aerodynamic, centrifugal, and spring forces acting on the propeller 32. To prevent damage to the propeller control hardware, a command should be issued such that the servos or actuators move with the blades 40. The discrete dump valve activated input controls operation of this command. The dump valve activated command is a composite signal based on the dump valve itself, as well as monitoring errors in the electro-mechanical actuator position compared to the propeller position. In embodiments where the dump valve is active, the measured propeller position is provided to the actuator as the propeller EMA command.

FIG. 8 illustrates a control system 300 configured to determine if the zero thrust map 255 (FIG. 7) should be used to position the propeller. Three discrete inputs representing the commands to increase thrust, decrease thrust, or zero thrust, generated by various movements of the toggle 160 of switch 155 are mutually exclusive. If a failure of the switch 155 or another failure, such as an engine failure for example, is detected, the system 300 defaults to a zero thrust mode and the discrete latched loop close switch (switch 205 of FIG. 6) closes. This closing of the discrete latched loop close switch 205 selects the track mode of operation of the control system 200 illustrated in FIG. 6 and also selects the zero thrust map 255 output (FIG. 7) to be provided as an input to the control system 200. Alternatively, the zero thrust mode may be achieved during normal operation of the aircraft 10 by translating the toggle 160 to the third position.

Use of the pilot interface 100 including the pitch control system 150 lowers the workload for an operator of the pilot interface and also increases the operator's awareness of the propeller's position. As a result of this awareness, the operator may respond more efficiently and with improved handling qualities to unforeseen or hazardous conditions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of adjusting a pitch of a plurality of propeller blades comprising:
    measuring an airspeed and rotor revolutions per minute;
    determining in response to the airspeed, rotor revolutions per minute, and at least one discrete logical value, whether to operate a control system for adjusting the pitch of the plurality of propeller blades in a slew mode or a track mode; wherein the at least one discrete logical value is selected from the pitch control system command, an increase/decrease thrust command, latched switch fail, latched loop close switch, and dump valve activated;
    issuing a command to one or more actuators coupled to the propeller blades; and
    changing the pitch of the one or more propeller blades via the one or more actuators.

2. The method according to claim 1, wherein in slew mode, the command for the one or more actuators is generated manually via a pitch control system.

3. The method according to claim 2, wherein the pitch control system includes a switch movable between a neutral position and a plurality of non-neutral position, and the command is generated based on the non-neutral position and a length of time that the switch is held in that non-neutral position.

4. The method according to claim 1, wherein in track mode, the command for the one or more actuators is generated automatically by a flight control computer.

5. The method according to claim 1, wherein upon detection of an error, track mode is selected.

* * * * *